Patented Nov. 30, 1937

2,100,527

UNITED STATES PATENT OFFICE 2,100,527

PREPARATION OF AMINO-HALOGEN ANTHRAQUINONES

Myron S. Whelen, Milwaukee, Wis., assignor to E. I. du Pont de Nemours & Company, Wilmington, Del., a corporation of Delaware No Drawing. Application June 24, 1936, Serial No. 87,120

3 Claims. (Cl. 260—60)

This invention relates to the preparation of amino-halogen-anthraquinones and more particularly to a new and improved process for the preparation of 1-amino-6-halogen-anthraquinone.

Heretofore 1-amino-6-chloroanthraquinone was prepared by nitrating beta-sulfonic acid sodium salt (silver salt), separating the isomers and replacing the sulfonic acid group with chlorine, followed by reduction of the nitro group. This process, however, is a very delicate one and not suitable for the commercial preparation of a relatively pure product. This process also does not lend itself to the preparation of 1-amino-6-bromoanthraquinone, since the sulfonic acid group cannot be replaced with bromine.

It is an object of the present invention to provide a new and improved process for the preparation of 1-amino-6-halogen-anthraquinones which is simple, economical, and commercially practical for the preparation of these products.

It is a further object of the invention to provide a process whereby the 1-amino-6-bromoanthraquinone may be prepared in a manner analogous to the preparation of 1-amino-6-chloroanthraquinone.

I have found that 6-halogen-1-anthraquinonesulfonic acid in the form of its alkali metal salt can be directly amidated under pressure, preferably in the presence of an oxidizing agent, and that the resulting product without further purification is of exceedingly high quality and is obtained in high yields.

According to this invention 6-halogen-1-anthraquinonesulfonic acid alkali metal salt is heated in an autoclave with an excess of ammonia at a temperature of about 150° C., whereby the sulfonic acid group is completely replaced without appreciable replacement of the halogen atom. Where the temperature is raised above 170° and ammonia in too high concentration is employed, replacement of the halogen also takes place. This process is, therefore, preferably carried out at temperatures not exceeding 160°, using not over 25% ammonia solution, with a pressure of from about 200 to 300 pounds. The pressure may be varied depending upon the temperature and concentration of ammonia employed.

The following examples are given to more fully illustrate the invention. The parts used are by weight.

Example 1

100 parts of 6-chloro-1-anthraquinonesulfonic acid sodium salt, 300 parts of 21% ammonia and 30 parts of nitrobenzene-meta-sulfonic acid sodium salt are heated together in an autoclave at about 145-155° C. for a period of 20-24 hours. After cooling water is added to reduce the ammonia concentration, and after the addition of 10 parts of sodium hydroxide the ammonia is distilled off and recovered. The mass is then filtered hot, and the separated material is washed with hot water until free of alkali. The material obtained is 1-amino-6-chloroanthraquinone of excellent purity which without further purification has a melting point of 205-210° C. The purity of the final product is of course dependent in some degree upon the purity of the starting material.

Example 2

6-bromo-1-anthraquinonesulfonic acid sodium salt may be similarly treated with ammonia to give relatively pure 1-amino-6-bromoanthraquinone.

In the above examples it will, of course, be obvious that the ammonium or potassium salts may be used in place of the sodium salt specifically mentioned. Other oxidizing agents such as alkali metal chlorates, etc., may be substituted for the organic oxidizing agent of the example.

I claim:

1. In the process for preparing 1-amino-6-halogen-anthraquinone, the step which comprises reacting 6-halogen-1-anthraquinonesulfonic acid alkali metal salts with ammonia under pressure at a temperature not sufficiently high to cause replacement of the halogen atom.

2. In the process for preparing 1-amino-6-chloroanthraquinone, the step which comprises reacting 6-chloro-1-anthraquinonesulfonic acid alkali metal salts with ammonia under pressure, and at a temperature of approximately 150° C.

3. In the process for preparing 1-amino-6-chloroanthraquinone, the step which comprises reacting 6-chloro-1-anthraquinonesulfonic acid alkali metal salts with ammonia of approximately 25% concentration in the presence of an oxidizing agent, at a temperature not to exceed 170° C., and under a pressure of from 200 to 300 pounds.

MYRON S. WHELEN.